United States Patent
Becker et al.

(10) Patent No.: US 7,463,187 B2
(45) Date of Patent: Dec. 9, 2008

(54) METHOD AND SYSTEM OF IMPROVING ALTIMETER ACCURACY BY USE OF A SEPARATE PEAK RETURN SIGNAL TRACKING

(75) Inventors: Robert C. Becker, Eden Prairie, MN (US); Steven K. Stegemeyer, Fridley, MN (US)

(73) Assignee: Honeywell International Inc., Morristown, NJ (US)

( * ) Notice: Subject to any disclaimer, the term of this patent is extended or adjusted under 35 U.S.C. 154(b) by 31 days.

(21) Appl. No.: 11/535,543

(22) Filed: Sep. 27, 2006

(65) Prior Publication Data
US 2008/0074308 A1    Mar. 27, 2008

(51) Int. Cl.
*G01S 13/08* (2006.01)
*G01S 7/28* (2006.01)
*G01S 7/40* (2006.01)
*G01S 13/18* (2006.01)
*G01S 13/00* (2006.01)

(52) U.S. Cl. .............................. 342/94; 342/89; 342/91; 342/92; 342/118; 342/120; 342/165; 342/173; 342/175; 342/195

(58) Field of Classification Search .................. 342/118, 342/120–123, 89, 94–97, 175, 195, 91–93, 342/165, 173, 174
See application file for complete search history.

(56) References Cited

U.S. PATENT DOCUMENTS

| | | | | |
|---|---|---|---|---|
| 3,243,810 A | * | 3/1966 | Ramsay | 342/123 |
| 3,739,379 A | * | 6/1973 | Davis | 342/120 |
| 4,435,708 A | * | 3/1984 | Kyriakos | 342/122 |
| 4,816,834 A | * | 3/1989 | Bjorke | 342/120 |
| 5,150,125 A | * | 9/1992 | Hager | 342/120 |
| 5,719,582 A | * | 2/1998 | Gray | 342/120 |
| 5,731,782 A | * | 3/1998 | Walls | 342/120 |
| 6,407,697 B1 | * | 6/2002 | Hager et al. | 342/120 |
| 6,674,397 B2 | * | 1/2004 | Hager et al. | 342/120 |
| 6,731,234 B1 | * | 5/2004 | Hager et al. | 342/94 |
| 2003/0210176 A1 | * | 11/2003 | Hager et al. | 342/118 |

FOREIGN PATENT DOCUMENTS

| | | | |
|---|---|---|---|
| GB | 2029152 A | * | 3/1980 |
| GB | 2224176 A | * | 4/1990 |

OTHER PUBLICATIONS

J.R. Jensen, "Radar Altimeter Gate Tracking: Theory and Extension"; IEEE Transactions on Geoscience and Remote Sensing; vol. 37, No. 2; Mar. 1999.*

* cited by examiner

*Primary Examiner*—Bernarr E Gregory
(74) *Attorney, Agent, or Firm*—Fogg & Powers LLC

(57) ABSTRACT

A method to control a track gate and a level gate in an altimeter tracking an altitude of an airborne vehicle comprising emitting signals, directed toward a terrain, from the airborne vehicle, receiving terrain echo signals, positioning the track gate to a selected reference amplitude on the rising edge of the terrain echo signals, positioning the level gate to within a selected range of the peak amplitude level of the terrain echo signals, measuring a change in a location of the peak amplitude between sequentially received terrain echo signals, and varying a separation between the track gate and the level gate based on the measured change in the location of the peak amplitude. The terrain echo signals comprise reflections of the emitted signals from the terrain, and each terrain echo signal has a rising edge and a peak amplitude.

20 Claims, 8 Drawing Sheets

METHOD AND SYSTEM OF IMPROVING ALTIMETER ACCURACY BY USE OF A SEPARATE PEAK RETURN SIGNAL TRACKING

BACKGROUND

In radar altimeter operation, during aircraft roll or pitch maneuvers, it is possible for the altimeter track (range) gate to slide off the true altitude because the signal level is not maintained with sufficient accuracy. When the aircraft banks errors in the altitude can be generated due to coupled-control-loop induced positioning errors between the track gate and the level gate that are positioned relative to each other at a fixed separation. Likewise, variations in the terrain with respect to the attitude of the aircraft cause errors or inaccuracies due to the coupled-control-loop induced positioning errors. In the worst case, these positioning errors can result in coupled control loop oscillations that result in oscillations in the altitude value the radar altimeter reports. Such errors can cause unsafe flying conditions especially for aircraft that bank at large angles or fly over steep terrain, especially if these occur at low altitudes and the size of the altitude oscillations is a large fraction of the actual altitude.

When the airborne vehicle banks, the shape of the received waveform, often called the terrain echo, degrades. Ideally, the terrain echo would resemble a square pulse. Because the transmitted signal from the radar altimeter spreads across the ground, the shape of the terrain echo more closely resembles a triangular pulse with a steep slope on the leading edge and a shallower slope on the falling edge. When the received terrain echo signal spreads out in this manner, the track gate slides outbound away from the peak. The track gate control loop is designed to respond faster than the level gate. Thus, with a fixed separation between the track and level gates, the level gate is forced outbound along with the track gate. The track gate and level gate continue to slide outbound away from the peak until the amplitude level of the signal drops enough for the amplitude of the signal within the track gate to be at the track reference level. Once the track gate amplitude is at the track reference level the track gate control loop is satisfied.

At this point, the amplitude of the signal within the level gate is too high. This forces the level control loop to decrease the overall amplitude of the terrain echo. However, as level control loop pulls down the peak signal amplitude, the amplitude of the signal in the track gate falls below the track reference level. This causes the track control loop to slide the track gate position outbound until the signal within the track gate is at the track reference level. If the terrain echo signal has a sufficiently broad peak, the level gate will eventually measure a relatively constant signal level over a range of positions and the control loops for both the track gate and level gate will be satisfied. As defined herein, a gate slides inbound when it moves downward in altitude. Likewise, a gate slides outbound when it moves upward in altitude.

If the terrain echo peak is narrow, the level gate can be driven past the terrain echo peak. This results in a drop in level amplitude, which causes the level control loop to increase the signal level. This also causes the signal at the track point to rise and this rise causes the signal level in the track gate to rise above the track reference level. The track control loop will drive the track gate inbound until the signal level in the track gate is at the track reference level. Since the track gate and level gate are coupled together at a fixed separation from one another, the level gate is also pulled inbound and is pulled toward the terrain echo peak. As the level gate is pulled toward the peak, the level signal increases and the level control loop drives the signal level down. This also drives the level of the signal in the track gate down and this causes the track gate control loop to drive the track gate position outbound and the cycle repeats.

Coupled control loop oscillations and their impact on system stability are well known within the control system community. The impact on radar altimeters can be inferred from Merril Skolnik's reference book, "Radar Handbook." in Section 18.8 of Skolnik's book, there is an extensive discussion of the impact of various forms of amplitude noise on pointing errors in tracking radar. Although Skolnik is primarily concerned with tracking and scanning radar systems, one can easily relate noise induced pointing angle errors in tracking radars to altitude errors in radar altimeters. In tracking radars, pointing angle is a critical system output. In radar altimeters, altitude output is the critical system output. Amplitude fluctuations in tracking radars induce pointing errors as the radar interprets target echo amplitude changes as changes in apparent target position. These same amplitude fluctuations are interpreted by radar altimeters as changes in apparent altitude. Thus, the noise introduced into the terrain echo signals by instability in the echo amplitude caused by coupled control loop oscillations will be interpreted as an apparent change in altitude. The gain control loop is relatively slow compared to the track loop and the terrain echo amplitude oscillations will be translated into altitude variations. These oscillations occur at a slow enough rate that they cannot be effectively removed by filtering or averaging without introducing an unacceptable lag in the response of the radar altimeter to actual changes in altitude.

SUMMARY

A method to control a track gate and a level gate in an altimeter tracking an altitude of an airborne vehicle comprising emitting signals, directed toward a terrain, from the airborne vehicle, and receiving terrain echo signals. The terrain echo signals comprise reflections of the emitted signals from the terrain, and each terrain echo signal has a rising edge and a peak amplitude. The method also includes positioning the track gate to a selected reference amplitude on the rising edge of the terrain echo signals, positioning the level gate to within a selected range of the peak amplitude level of the terrain echo signals, measuring a change in a location of the peak amplitude between sequentially received terrain echo signals, and varying a separation between the track gate and the level gate based on the measured change in the location of the peak amplitude.

DRAWINGS

In accordance with common practice, the various described features are not drawn to scale but are drawn to emphasize features relevant to the present invention. Reference characters denote like elements throughout figures and text.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Figure 1:
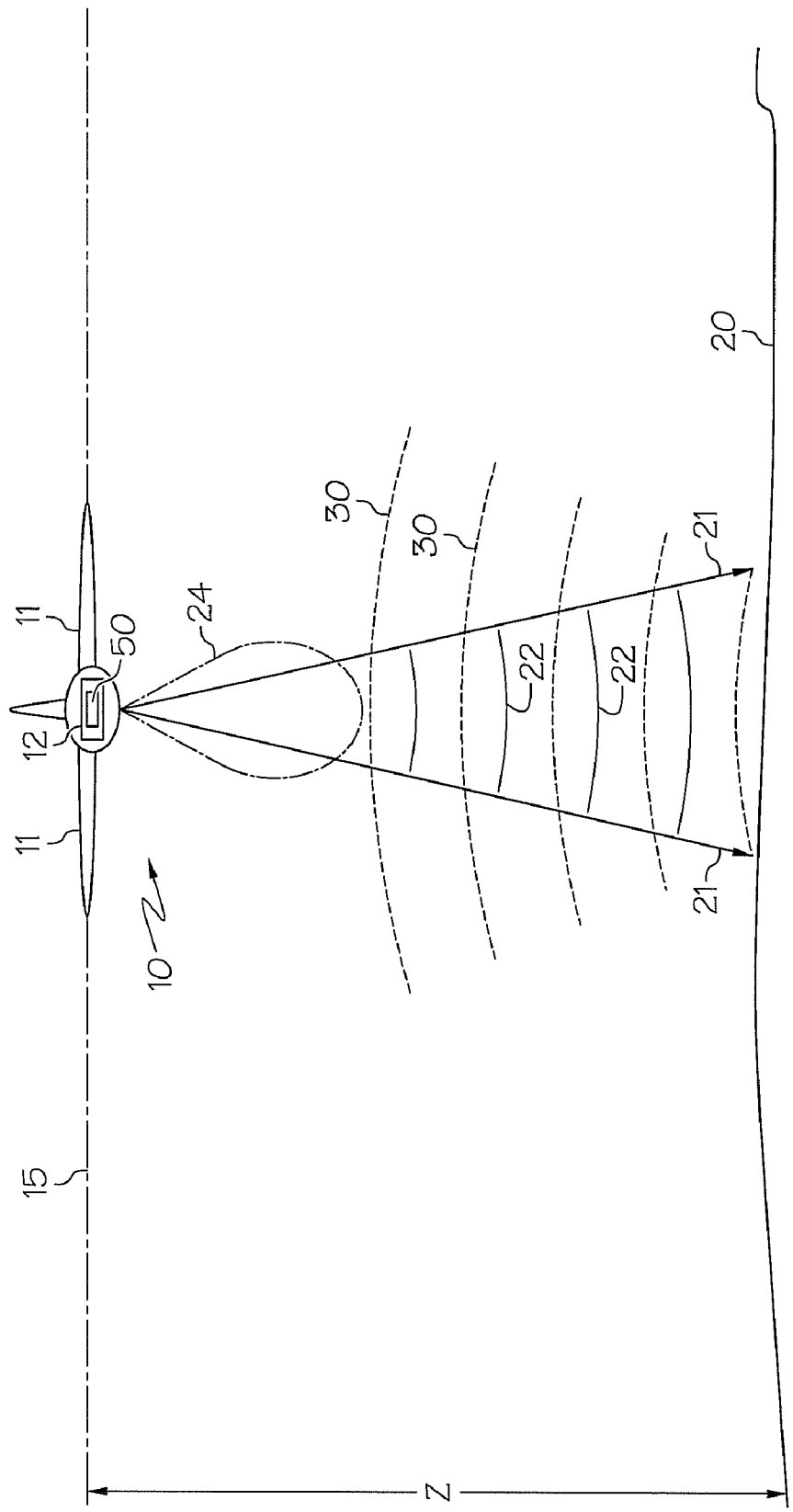
FIG. 1 shows one embodiment of an airborne vehicle a radar altimeter within which is a system to reduce coupled-control-loop oscillations in accordance with the present invention.

FIG. 1 shows one embodiment of an airborne vehicle 10 including a radar altimeter 12 within which is a system to reduce coupled-control-loop oscillations 50 in accordance with the present invention. The system to reduce coupled-control-loop oscillations 50 is also referred to herein as "system 50." The radar altimeter 12 is also referred to herein as "altimeter 12." The airborne vehicle 10 has wings 11 that lie substantially in a plane shown in cross-section as dashed line 15. System 50 is an integral part of the altimeter system 12 for the airborne vehicle 10.

As shown in FIG. 1, the plane 15 in which wings 11 lie is substantially parallel to the flat terrain 20 beneath the airborne vehicle 10. Flat terrain 20 as defined herein is terrain that has only small slopes over the area that reflects signals emitted from the airborne vehicle 10. In one implementation of this embodiment, flat terrain 20 has slopes of less than 20 degrees over the area that reflects signals emitted from the airborne vehicle 10.

The extent of the radiation of the signals emitted from the airborne vehicle 10 is indicated by arrows 21. The phase fronts of the signals emitted from the airborne vehicle 10 are shown by lines represented generally by the numeral 22. The term "phase fronts 22" is also referred to herein as the "signal 22" that is emitted from the airborne vehicle 10. The shape of the phase fronts 22 is due to the antenna pattern 24 of the antenna in the airborne vehicle 10 that emits the signal. In the implementation of this embodiment shown in FIG. 1, the phase fronts 22 are approximately parallel to the flat terrain 20.

The flat terrain 20 reflects the wave fronts 22 emitted from the airborne vehicle 10 as terrain echo wave fronts represented generally by the numeral 30. The terrain echo wave fronts 30 are also referred to herein as "terrain echo signals 30." The terrain echo signals 30 are received by the system 50 in the airborne vehicle 10 and generate a waveform that includes information indicative of the terrain echo signals 30. The altimeter 12 and the system 50 process the received terrain echo signals 30 to determine the airborne vehicle is at an altitude of approximately Z.

Figure 2:
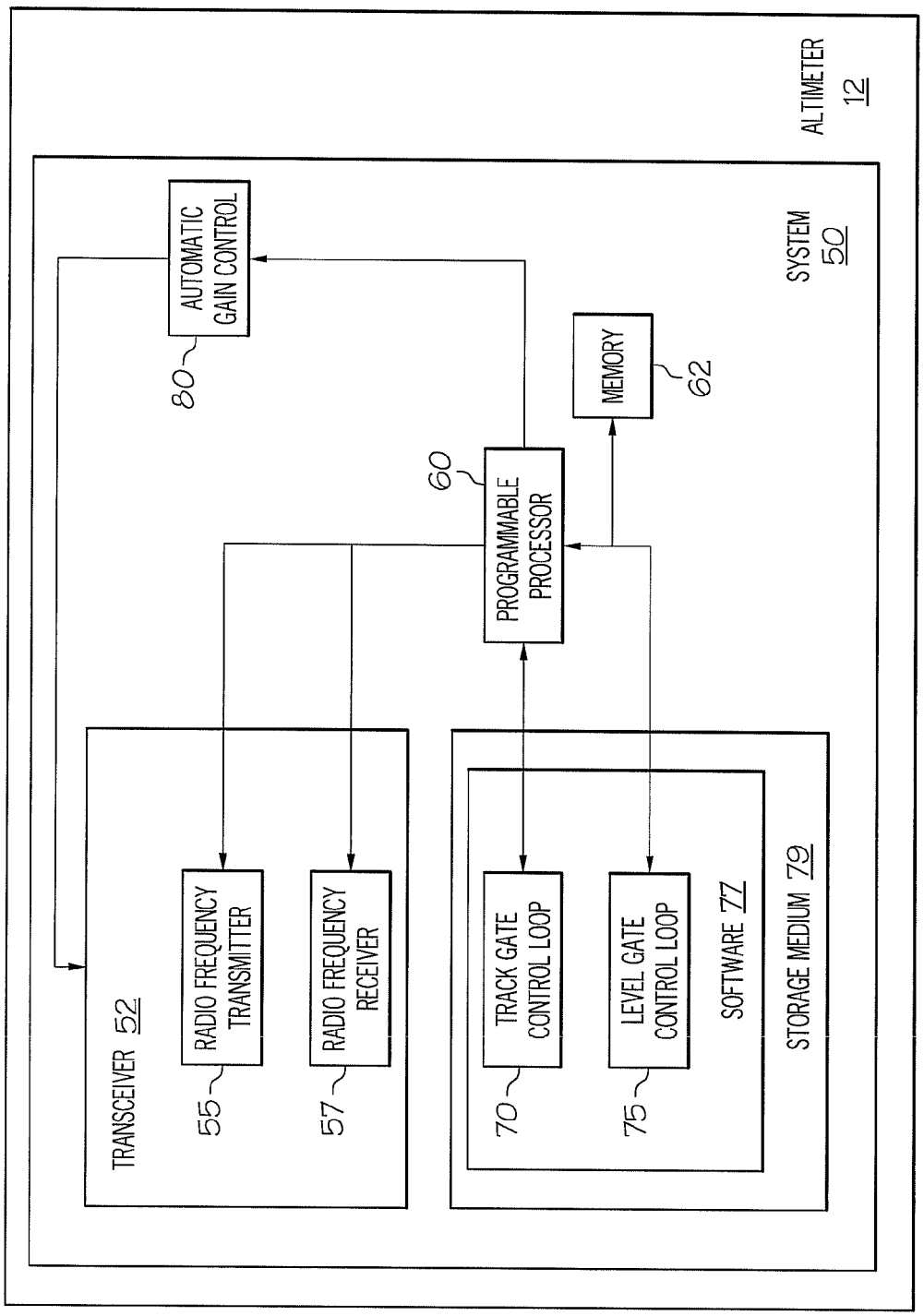
FIG. 2 is a block diagram of one embodiment of a radar altimeter including a system to reduce coupled-control-loop oscillations in accordance with the present invention.

FIG. 2 is a block diagram of one embodiment of a radar altimeter within which is a system to reduce coupled-control-loop oscillations 50 in accordance with the present invention. System 50 includes a programmable processor 60, a memory 62, an automatic gain control 80, a radio frequency receiver 57, a radio frequency transmitter 55 and software 77 stored or otherwise embodied in or on a storage medium 79. The software 77 includes a track gate control loop 70, and a level gate control loop 75. The term software includes instructions, such as software, firmware or other program code. The radio frequency receiver 57 and the radio frequency transmitter 55 comprise a transceiver 52. The programmable processor 60 is communicatively coupled to the memory 62, the track gate control loop 70, the level gate control loop 75, the radio frequency receiver 57, the radio frequency transmitter 55 and the automatic gain control 80. The automatic gain control 80 is communicatively coupled to the transceiver 52. The automatic gain control 80 adjusts the gain on the radio frequency receiver 57. The automatic gain control 80 can also adjust the output power of the transmitter 52. Depending on the overall system design, the automatic gain control 80 can adjust the gain of the radio frequency receiver 57, the output power of the radio frequency transmitter 52, or a combination of both.

The storage medium 79 tangibly embodies program instructions for execution by the programmable processor 60. The programmable processor 60 executes a program of instructions to perform specified functions by operating on input data and generating appropriate output. The programmable processor 60 receives instructions and data from the memory 62 such as a read-only memory and/or a random access memory. The software 77 comprises various elements of software, such as the track gate control loop 70 and the level gate control loop 75, each including the computer code, variable storage, control logic, and software interfaces that allow the element to interact with other elements and with external interfaces.

The track gate control loop 70 positions the track gate with respect to a terrain echo signal 30 to maintain an amplitude (referred to herein as "track amplitude") at a selected reference amplitude (also referred to herein as "track reference"). The level gate control loop 75 adjusts the gain of the transceiver via the automatic gain control 80 so that the amplitude of terrain echo signal 30 in the level gate is maintained at a fixed level, herein referred to as the "level reference." The separation between the track gate and the level gate is variable.

The radio frequency transmitter 55 emits radio frequency signals 22 (FIG. 1) directed toward the terrain 20. The radio frequency receiver 57 receives terrain echo signals 30 reflected from the terrain 20. The programmable processor 60 executes the track gate control loop 70 to analyze the terrain echo signals 30 and executes the level gate control loop 75 to analyze the terrain echo signals 30. The automatic gain control 80 is executable by the programmable processor 60 to adjust the gain of the radio frequency receiver 57 in order to adjust the terrain echo signal 30 to the level reference. The adjustment is based on a comparison of the terrain echo signal level within the level gate to the level reference.

The methods and techniques described here may be implemented in digital electronic circuitry, or with a programmable processor (for example, a special-purpose processor or a general-purpose processor such as a computer) firmware, software, or in combinations of them.

Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

The programmable processor 60 executes software and/or firmware that causes the programmable processor 60 to perform at least some of the processing described here as being performed by the system 50. At least a portion of such software and/or firmware executed by the programmable processor 60 and any related data structures are stored in memory 62 during execution. Memory 62 comprises any suitable memory now known or later developed such as, for example, random access memory (RAM), read only memory (ROM), and/or registers within the programmable processor 60. In one implementation, the programmable processor 60 comprises a microprocessor or microcontroller. Moreover, although the programmable processor 60 and memory 62 are shown as separate elements in FIG. 2, in one implementation, the programmable processor 60 and memory 62 are implemented in a single device (for example, a single integrated-circuit device). Likewise, although the storage medium 79 and memory 62 are shown as separate elements in FIG. 2, in one implementation, the memory is incorporated in the storage medium 79. In one implementation of this embodiment, the storage medium 79 comprises more than one storage medium. In one implementation, the programmable processor 60 comprises processor support chips and/or system support chips such as ASICs.

Figure 3:
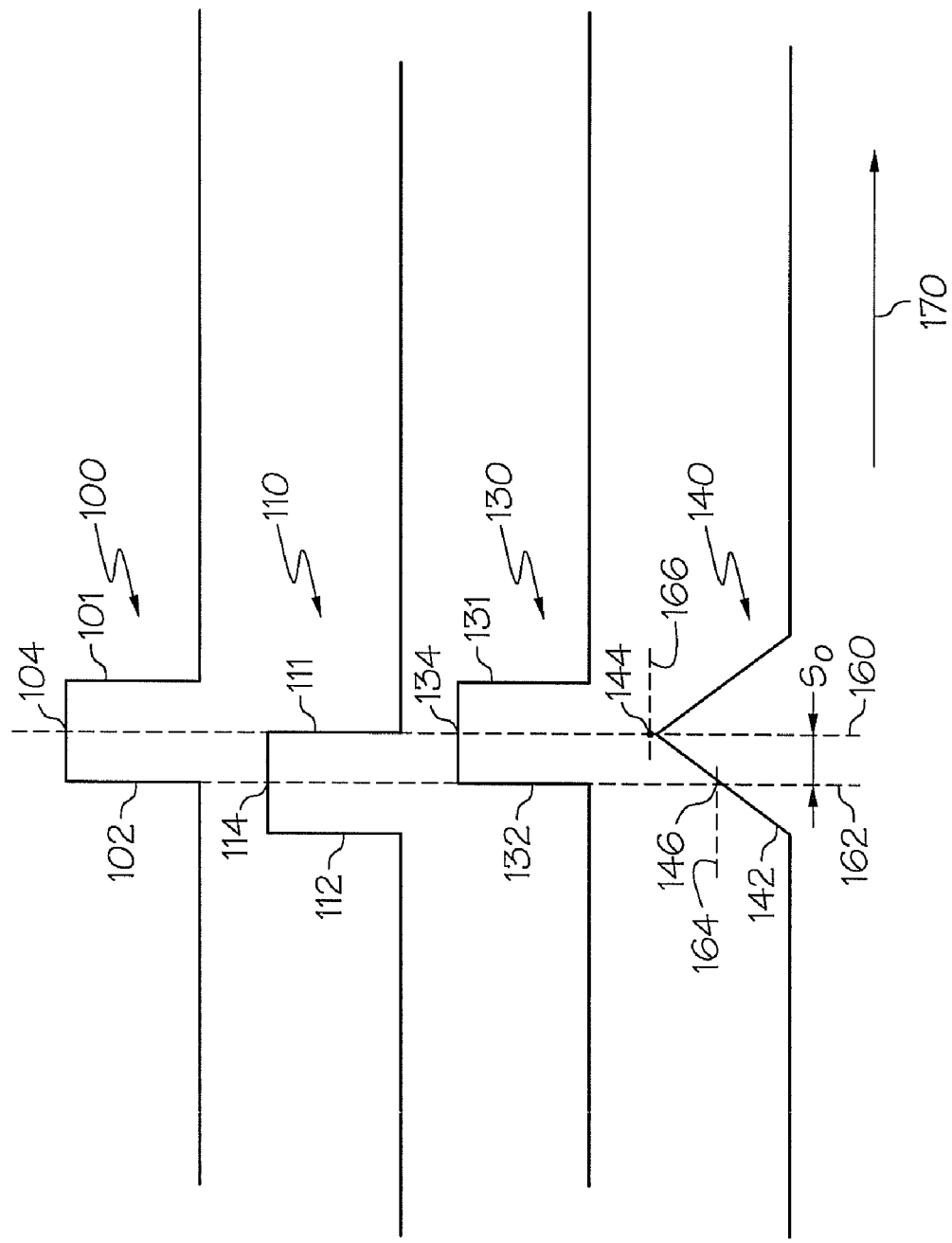
FIG. 3 shows one embodiment of a waveform indicative of an ideal terrain echo signal, a track gate, a level gate and an autocorrelation between the waveform and the track gate in accordance with the present invention.

FIG. 3 shows one embodiment of a waveform 100 indicative of an ideal terrain echo signal 30, track gate 110, level gate 130 and an autocorrelation 140 between the waveform 100 and the track gate 110 in accordance with the present invention. The waveform 100 for the terrain echo signal 30, track gate 110, level gate 130 and autocorrelation 140 are shown versus a common time frame and are offset vertically from each other for clarity. The signals shift in the direction of the arrow 170 as the altitude of the airborne vehicle 10 increases. The positions of the waveforms in time are referred to herein as "location." For example, the point 144 on the autocorrelation 140 is referred to as the "location of the peak amplitude" as is understandable by those of ordinary skill in the art. The programmable processor 60 (FIG. 2) executes software 77 that permits the track gate 110 and the level gate 130 to move independently of each other so that they are decoupled.

The waveform 100 indicative of an ideal terrain echo signal 30 for a point target is a square wave function having a rising edge 102 and a falling edge 101 and a center indicated by the numeral 104. The rising edge 102 and a falling edge 101 are representative of a rising edge of the terrain echo signal 30 and a falling edge of the terrain echo signal 30 detected at the radio frequency receiver 57 of system 50 (FIG. 2). The track gate represented generally by the numeral 110 has a rising edge 112 and a falling edge 111 and a center indicated by the numeral 114. The level gate represented generally by the numeral 130 has a rising edge 132 and a falling edge 131 and a center indicted by the numeral 134. As shown in FIG. 3, the level gate 130 is aligned with the waveform 100 indicative of an ideal terrain echo signal 30. The peak amplitude 144 is at the center of the autocorrelation 140 of the waveform 100 and the level gate 130 and is aligned under the center 104 of the waveform 100.

As shown in FIG. 3, dashed line 160 is aligned to the center 104 of the waveform 100, the falling edge 111 of the track gate 110, the center 134 of the level gate 130, and the peak amplitude 144 of the autocorrelation 140. As shown in FIG. 3, the dashed line 162 is aligned to the rising edge 102 of the waveform 100, the center 114 of the track gate 110, the rising edge 132 of the level gate 130, and the rising edge 142 of the autocorrelation 140. As shown in FIG. 3, the separation between the center 134 of the level gate 130 and the center 114 of the track gate 110 is about $S_0$. The selected reference amplitude, also referred to here as the "track reference", indicated as dashed line 164 intersects the dashed line 162 at the rising edged 142 of the autocorrelation 140 at the track point 146 (also referred to herein as the "track gate position 146."). The level reference amplitude level indicated as dashed line 166 (also referred to herein as the "level reference 166") intersects the dashed line 160 at the level point 144 or the "level gate position 144." The separation between the center point 114 of the track gate 110 and the center point 134 of the level gate 130 varies as the waveform 100 degrades to a non-ideal terrain echo signal as is described below with reference to FIG. 5.

In the implementation of this embodiment shown in FIG. 3 for an ideal terrain echo signal, the percentage of the track reference 164 is set to a percentage of the level reference amplitude level 166 that equals the percentage by which the track gate 110 overlaps with the with the waveform 100 indicative of an ideal terrain echo signal 30. As shown in the exemplary implementation of FIG. 3, the track point 146 (and track reference 164) is 50% of the level point 144 (and the level reference amplitude level 166) and the track gate 110 overlaps with 50% the waveform 100 whereas the level gate point 160 is 100% of the level reference 166 and the level gate 130 overlaps 100% of the waveform 100. This separation $S_o$ between the track gate position 162 and the level gate position 160 changes when the waveform 100 is degraded as the airborne vehicle 10 flies over steeply sloped terrain.

Figure 4A:
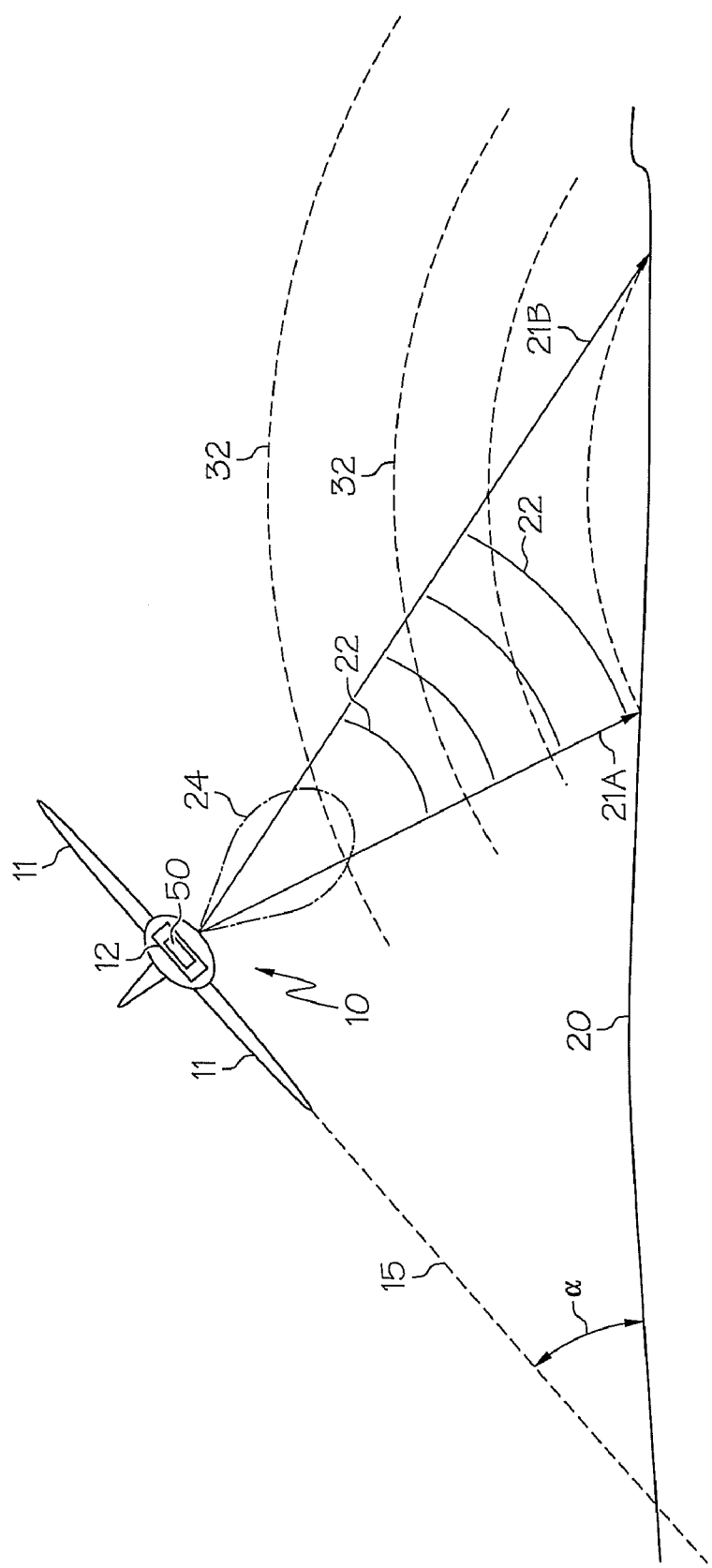
FIGS. 4A and 4B show exemplary angular configurations between an airborne vehicle and the terrains, which cause an altimeter to receive a non-ideal terrain echo signal.
Figure 4B:
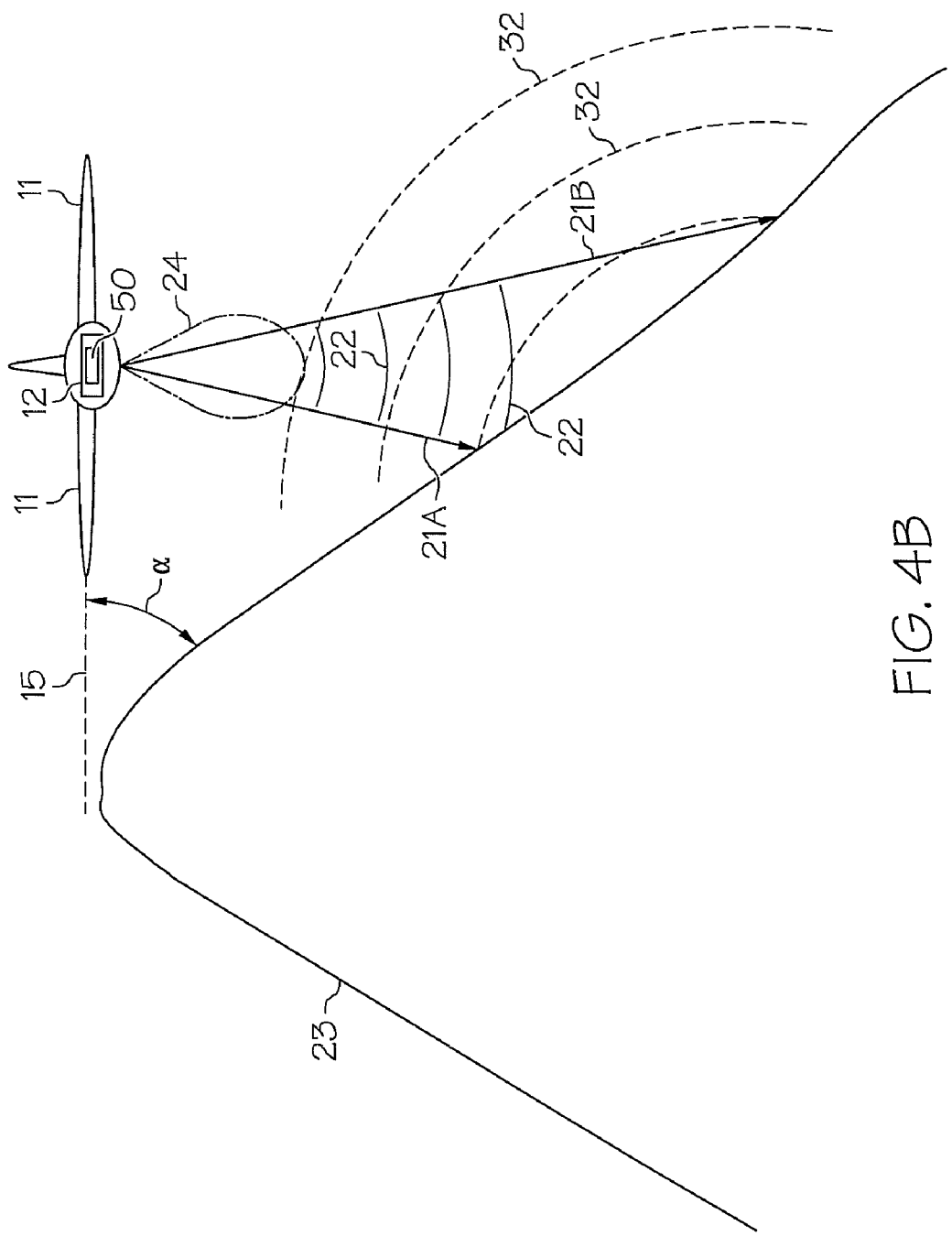

FIGS. 4A and 4B show exemplary angular configurations between an airborne vehicle 10 and the terrains which cause an altimeter to receive a non-ideal terrain echo signal. In FIGS. 4A and 4B, the closer extents of the radiation from signals emitted from the airborne vehicle 10 are indicated by arrows 21A and the further extents of the radiation from signals emitted from the airborne vehicle 10 are indicated by arrows 21B. In FIG. 4A, the airborne vehicle 10 is banking at an angle α with respect to relatively flat terrain 20. The plane of the wings 11 (shown in cross-section as dashed line 15) of the airborne vehicle 10 is at the angle α with respect to the flat terrain 20 beneath the airborne vehicle 10. The signal 22 is emitted from the airborne vehicle 10. The flat terrain 20 reflects the wave fronts 22 emitted from the airborne vehicle 10 as terrain echo wave fronts represented generally by the numeral 32. The terrain echo wave fronts 32 are also referred to herein as "terrain echo signals 32." A portion of the terrain echo signals 32 are received by the system 50 in the airborne vehicle 10 and generate a waveform that includes information indicative of the terrain echo signals 32. The terrain echo signals 32 are non-ideal in this configuration because the terrain echo signals 32 are spread out. The time for the reflected signals at the further extent 21B to reach system 50 in the airborne vehicle 10 is greater than the time for the reflected signals at the closer extent 24A to reach system 50.

In FIG. 4B, the un-banked airborne vehicle 10 is flying above a steep slope 22 in a mountainous terrain represented generally by the numeral 23. The plane 15 of the wings 11 of the airborne vehicle 10 is at the angle α with respect to the slope 22 in a mountainous terrain 23 beneath the airborne vehicle 10. The signal 22 is emitted from the airborne vehicle 10. The flat terrain 20 reflects the wave fronts 22 emitted from the airborne vehicle 10 as terrain echo wave fronts 32. A portion of the terrain echo signals 32 are received by the system 50 in the airborne vehicle 10 and generate a waveform that includes information indicative of the terrain echo signals 32. The terrain echo signals 32 are non-ideal in this configuration and similar to the terrain echo signal 32 of FIG. 4A.

Figure 5:
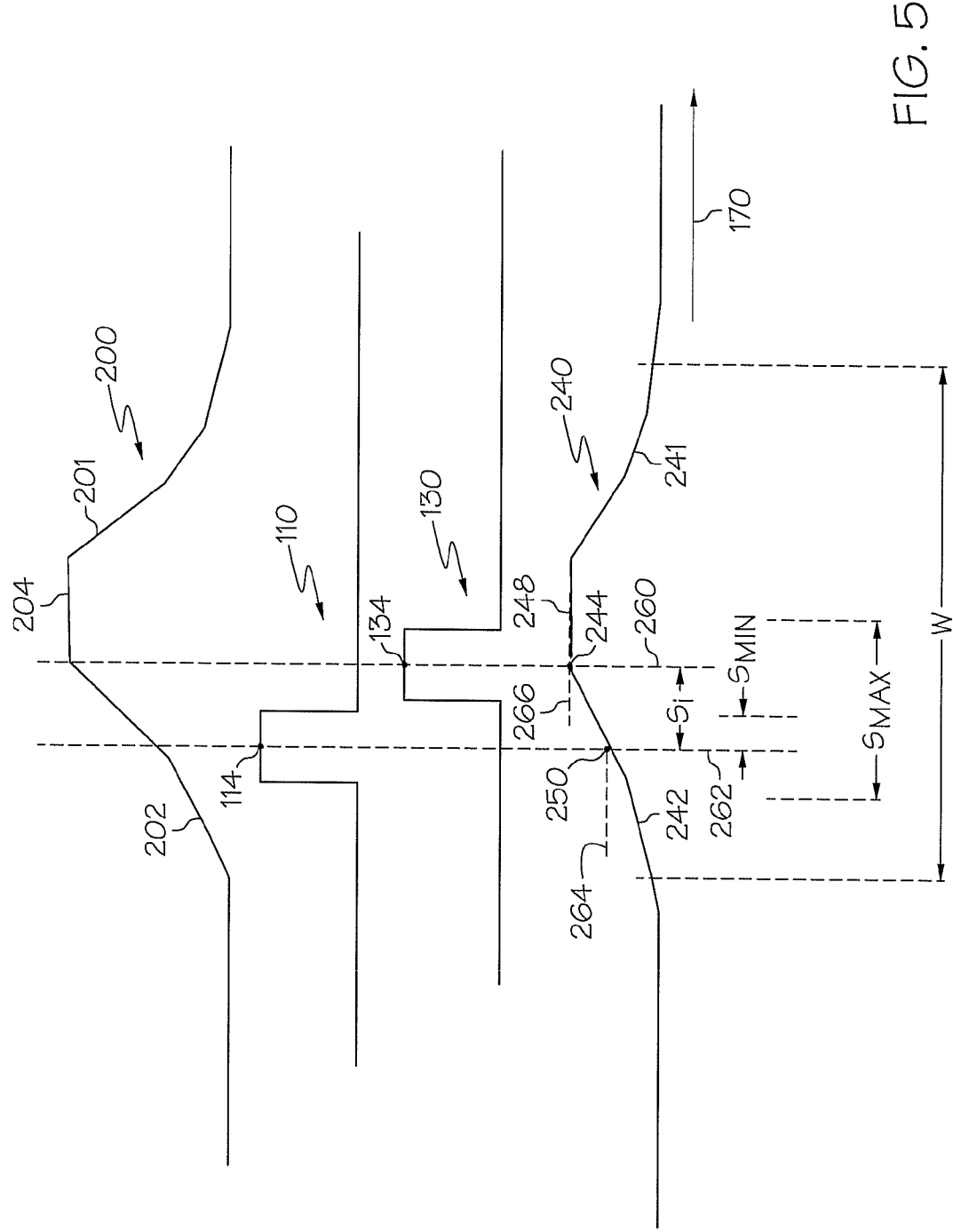
FIG. 5 shows one embodiment of a waveform indicative of a non-ideal terrain echo signal, a track gate, a level gate and an autocorrelation between the waveform and the track gate in accordance with the present invention.

FIG. 5 shows one embodiment of a waveform 200 indicative of a non-ideal terrain echo signal 32, a track gate 110, a level gate 130, and an autocorrelation 240 between the waveform 200 and the track gate 110 in accordance with the present invention. The terrain echo signals 32 (FIGS. 4A and 4B) that are received by the radar altimeter system 12 in the airborne vehicle 10 are displayed as the waveform 200 indicative of the non-ideal terrain echo signal 32. The non-ideal terrain echo signal 32 has a sloped rising edge 202 and a sloped falling edge 201 and a peak amplitude 204. The rising edge 202 and a falling edge 201 are representative of a rising edge of the terrain echo signal 32 and a falling edge of the terrain echo signal 32 detected at the radio frequency receiver 57 of system 12 (FIG. 2). The autocorrelation 240 has a sloped rising edge 242, a sloped falling edge 241 and a flat-topped peak amplitude 248. The peak amplitude 204 and peak amplitude 248 are correlated to each other. The autocorrelation 240 has a width of W that extends from a point of the rising edge 242 to a point of the falling edge 241 that is significantly below the track reference level. In one embodiment, this point could be where the autocorrelation function 240 has an amplitude that is $1/10^{th}$ of the track reference level. The level reference amplitude level 266 (also referred to herein as the "level reference 266") indicates the desired peak amplitude 248 of the waveform 200 indicative of the non-ideal terrain echo signal 32 and the autocorrelation 240. The rising edge 242 of the autocorrelation 240 reaches the peak amplitude 248 at the point 244. The selected reference amplitude 264 indicates the desired amplitude of the track point 250, which aligns with the center 114 of the track gate 110. As shown in FIG. 5, dashed line 260 is aligned to the center 134 of the level gate 130, and the point 244. The dashed line 262 is aligned to the center 114 of the track gate 110 and intersects the rising edge 242 of the autocorrelation 240 at the track point 250. As shown in FIG. 5, the separation between the center 134 of the level gate 130 and the center 114 of the track gate 110 is $S_1$ and $S_1$ is greater than $S_0$ (FIG. 3). Likewise, as seen on the autocorrelation 240, the separation between the track point 250 and the center 134 and the point 244 is $S_1$.

Since the level gate 130 is decoupled from the track gate 110, the level gate control loop 75 (FIG. 2) shifts the level gate 130 to a position where it is at (or near) the peak amplitude 248 of the autocorrelation 240 and the level gate 130 levels to (or close to) the full signal amplitude 248. The exact position of the level gate 130 within or near the peak amplitude 248 is determined by the programmable processor 60 during an execution of the level gate control loop 75 and track gate control loop 70.

At the same time, the track gate control loop 70 (FIG. 2) shifts the track gate 110 to a position near the track reference amplitude 264. The exact position of the track gate 110 is determined by the programmable processor 60 (FIG. 2) during an execution of the track gate control loop 70. Although the positions of the track gate 110 and the level gate 130 are decoupled and are not held to a fixed separation, in one implementation of this embodiment, they are loosely coupled and held to a maximum and/or a minimum separation.

In one implementation of this embodiment, the separation between the center 134 of the level gate 130 and the center 114 of the track gate 110 is never less than a minimum separation $S_{min}$ so that the track gate 110 never completely overlaps the level gate 130. In this case, the minimum separation $S_{min}$ is stored in the memory 62 and the programmable processor 60 determines where to position the track gate 110 and the control gate 130 based on the execution of the level gate control loop 75 and track gate control loop 70.

In another implementation of this embodiment, the separation between the center 134 of the level gate 130 and the center 114 of the track gate 110 is never greater than a maximum separation $S_{max}$ so that the level gate 130 never moves too far from the track gate 110. In this case, the maximum separation $S_{max}$ is stored in the memory 62 and the programmable processor 60 determines where to position the track gate 110 and the level gate 130 based on the execution of the level gate control loop 75 and track gate control loop 70. In yet another implementation of this embodiment, separation between the center 134 of the level gate 130 and the center 114 of the track gate 110 is never less than the minimum separation $S_{min}$ and is never greater than the maximum separation $S_{max}$.

Consequently, the level gate 130 stays at or near the signal peak 248 and does not introduce variations in signal level at the track gate position because the position of the level gate is independent of the position of the track gate. In one implementation of this embodiment, the level gate 130 stays at or near the point 244 where the rising edge 242 of the autocorrelation 240 reaches the peak amplitude 248. In this manner, the peak amplitude 248 remains at or near the level reference amplitude level 266 and no excess altitude noise is introduced to the altimeter 12 (FIG. 1).

Figure 6:
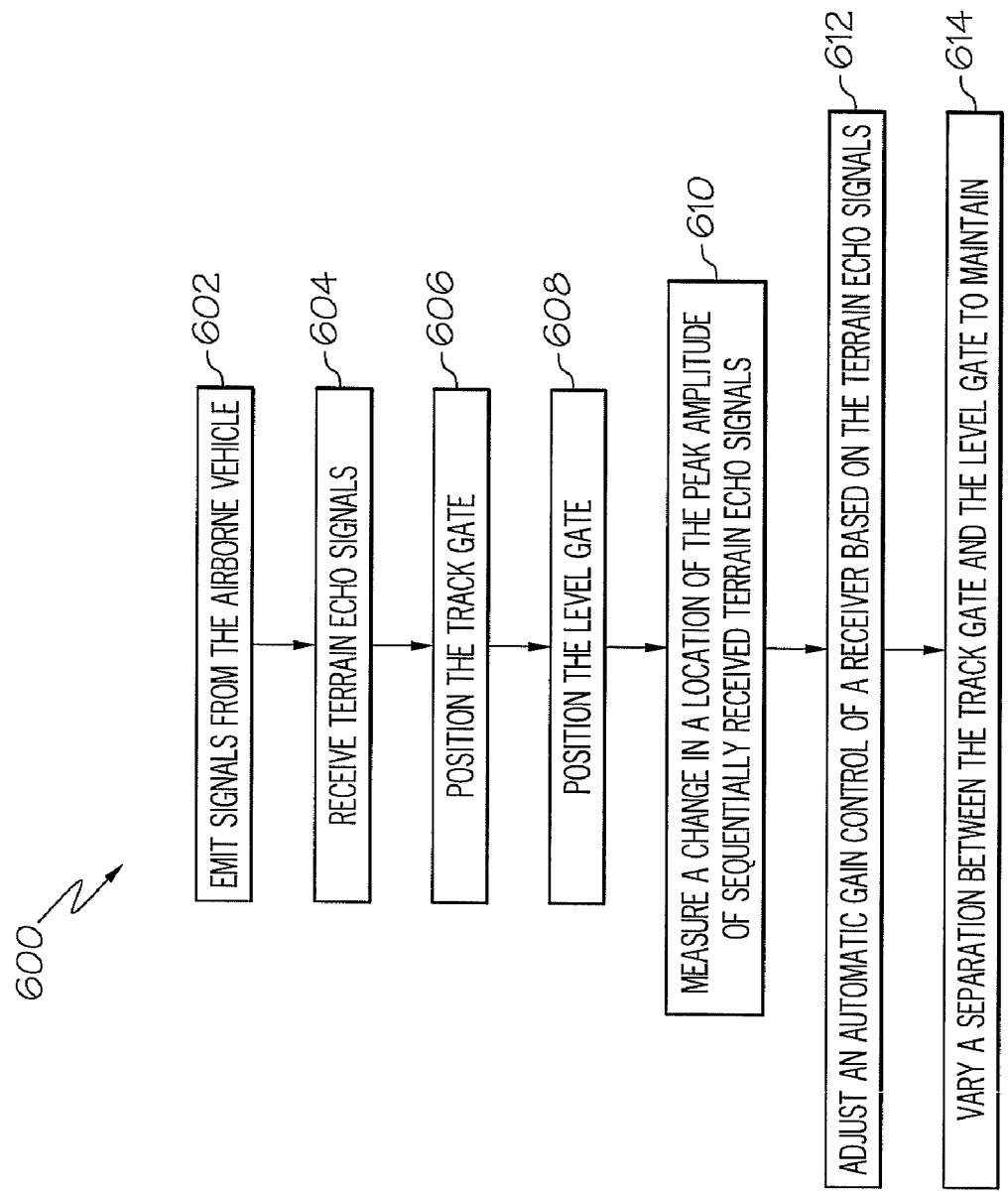
FIG. 6 is a flow diagram of one embodiment of a method to reduced coupled-control-loop oscillations between a track gate and a level gate in accordance with the present invention.

FIG. 6 is a flow diagram of one embodiment of a method 600 to control a track gate and a level gate in accordance with the present invention. The embodiment of method 600 is described as being implemented as system 50 which is contained within system 12 of FIG. 2 for a non-ideal terrain echo signal 32 (FIGS. 4A and 4B) that is tracked by the track gate 110 and the level gate 130 (FIG. 5). In such an embodiment, at least a portion of the processing of method 600 is performed by software 77, including track gate control loop 70 and level gate control loop 75, executing on the programmable processor 60 of system 12.

At block 602, signals are emitted from an airborne vehicle. The signals directed toward a terrain, such as flat terrain 20 (FIG. 4A) or mountainous terrain 23 (FIG. 4B). The electromagnetic fields from the radio frequency signals are emitted in a pattern that is dependent upon the antenna pattern 24 (FIGS. 4A and 4B). In one implementation of this embodiment, the radio frequency transmitter 55 emits signals from the airborne vehicle 10.

At block 604, terrain echo signals, which are reflections of the emitted signals from the terrain, are received. In one implementation of this embodiment, the radio frequency receiver 57 receives non-ideal terrain echo signals 32 (FIG. 5) that are reflected from the flat terrain 20 or mountainous 23 (FIGS. 4A and 4B). The received terrain echo signal 32 includes a rising edge and a falling edge and a peak amplitude as are indicated in waveform 200 as the rising edge 202 the falling edge 201 and the peak amplitude 204 (FIG. 5).

At block 606, the track gate is positioned to a selected reference amplitude on the rising edge of the terrain echo signals. In one implementation of this embodiment, the track gate control loop 70 positions the track gate 110 to a track reference amplitude 264 on the rising edge 202 of the terrain echo signals 32 represented by waveform 200.

At block 608, the level gate is positioned to within a selected range of the peak amplitude of the terrain echo signals. In one implementation of this embodiment, the level gate control loop 75 positions the level gate 130 to within a selected range of the peak amplitude 248 of the terrain echo signals 32 represented by waveform 200.

In another implementation of this embodiment, the positioning the level gate 130 comprises positioning the center 134 of the level gate 130 at the peak amplitude 248 of the terrain echo signals 32 represented by waveform 200.

In one implementation of this embodiment, the selected range is 10% of the flat-topped peak amplitude 248. In another implementation of this embodiment, the selected range is 5% of the width W (FIG. 5) of the autocorrelation 240.

At block 610, a change is measured in a location of the peak amplitude between the sequentially received terrain echo signals when the airborne vehicle rolls or pitches or when a slope of the reflecting terrain changes with respect to the airborne vehicle. In one implementation of this embodiment, the programmable processor 60 measures a change in a location of the peak amplitude 248 between the sequentially received terrain echo signals 32 when the airborne vehicle 10 rolls or pitches. In another implementation of this embodiment, the programmable processor 60 measures a change in a location of the peak amplitude 248 between the sequentially received terrain echo signals 32 when the angle between the reflecting terrain and the airborne vehicle 10 changes. For example, the location of the peak amplitude (or the center of the peak amplitude) changes when airborne vehicle 10 goes from flying above a flat terrain 20 with no slope to flying above a mountainous terrain 23 with a steep slope while maintaining a constant bank angle.

In one implementation of this embodiment, positioning the level gate (block 608) to within the selected range of the peak amplitude 248 comprises adjusting the position of the level gate 130 toward the peak amplitude 248 of the echo signal 32 based on the measured change in the location of the peak amplitude 248. Details about how the change is measured in a location of the peak amplitude between the sequentially received terrain echo signals are described below with reference to method 700 of FIG. 7.

At block 612, an automatic gain control is adjusted based on the received terrain echo signals to maintain the peak amplitude of the echo signals at the level reference amplitude level. In one implementation of this embodiment, the programmable processor 60 adjusts an automatic gain control 80 of the radio frequency receiver 57 based on the received terrain echo signals 32 to maintain the peak amplitude 248 of the terrain echo signals to the level reference amplitude level 266. In another implementation of this embodiment, programmable processor 60 adjusts an automatic gain control 80 of the radio frequency transmitter 52 based on the received terrain echo signals 32 to maintain the peak amplitude 248 of the terrain echo signal to the level reference amplitude 266. In yet another implementation of this embodiment, programmable processor 60 adjusts an automatic gain control 80 of a combination of the radio frequency receiver 57 and the radio frequency transmitter 52 based on the received terrain echo signals 32 to maintain the peak amplitude 248 of the terrain echo signal to the level reference amplitude 266.

At block 614, a separation between the track gate and the level gate is varied by an amount that is based on the measured change in the location of the peak amplitude. In one implementation of this embodiment, the separation between the track gate 110 and the level gate 130 is varied while maintaining the separation $S_1$ at more than a minimum separation $S_{min}$. In another implementation of this embodiment, the separation $S_1$ between the track gate 110 and the level gate 130 is varied while maintaining the separation $S_1$ at less than a maximum separation $S_{max}$. In yet another implementation of this embodiment, the separation $S_1$ between the track gate 110 and the level gate 130 is varied while maintaining the separation $S_1$ at more than a minimum separation $S_{min}$ and at less than a maximum separation $S_{min}$.

The execution of the level gate control loop 75 by the programmable processor 60 results in an output from the programmable processor 60 that adjusts the gain in the automatic gain control 80. The automatic gain control 80 adjusts the gain on the radio frequency receiver 57. In another implementation of this embodiment, the automatic gain control 80 adjusts the gain on the radio frequency transmitter 52. In yet another embodiment, the automatic gain control 80 adjusts the gain of the radio frequency receiver 57 and the gain of the radio frequency transmitter 57.

Figure 7:
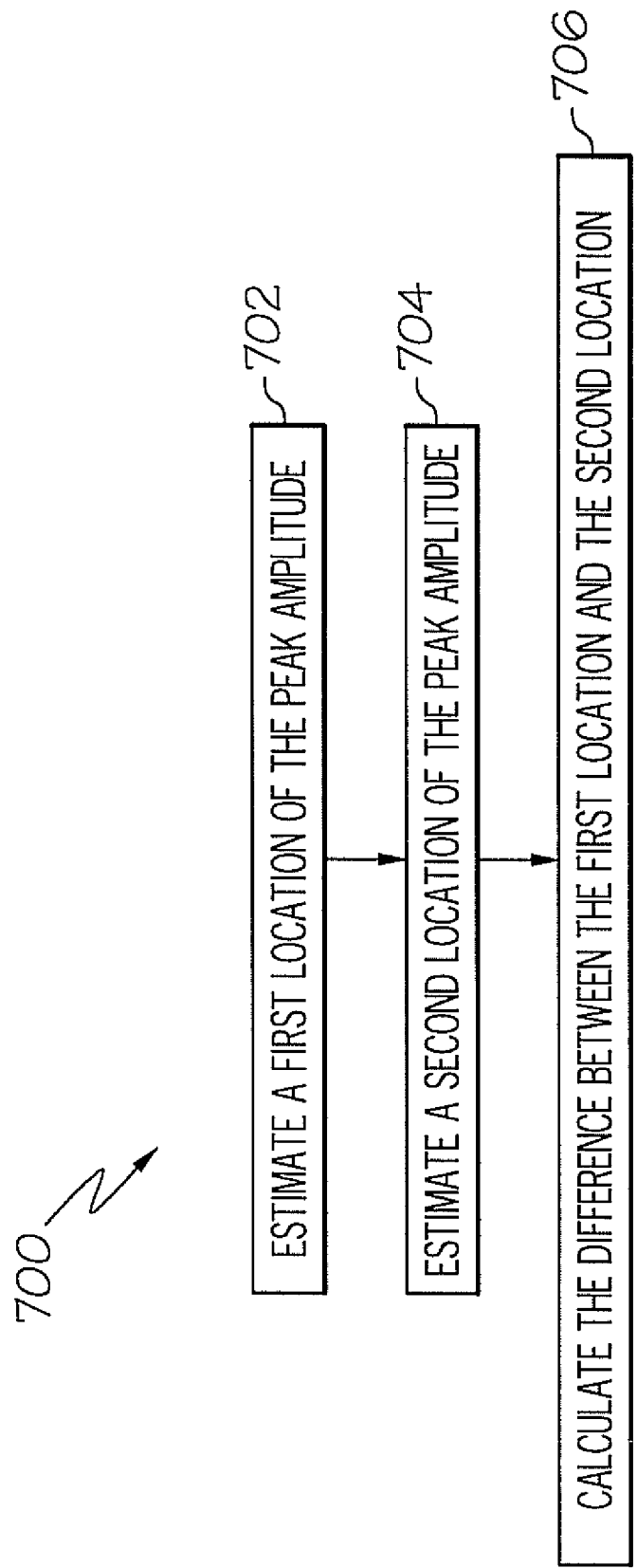
FIG. 7 is a flow diagram of one embodiment of a method to measure change in location of a peak amplitude in accordance with the present invention.

FIG. 7 is a flow diagram of one embodiment of a method to measure change in location of the peak amplitude in accordance with the present invention. The embodiment of method 700 is described as being implemented using the system 50 within radar altimeter 12 of FIG. 2 for a non-ideal terrain echo signal 32 (FIGS. 4A and 4B) that is tracked by the track gate 110 and the level gate 130 (FIG. 5). In such an embodiment, at least a portion of the processing of method 600 is performed by software 77 including track gate control loop 70 and level gate control loop 75, executing on the programmable processor 60 of system 12.

At block 702, a first location of the peak amplitude is estimated. In one implementation of this embodiment, the first location of the peak amplitude is estimated by measuring a difference in amplitude between signals in a first set of sequentially-received-terrain-echo signals. In an exemplary implementation of this embodiment, the programmable processor 60 estimates a first location of the peak amplitude by measuring the difference in amplitude between signals in the first set of sequentially-received-terrain-echo signals. The first set of sequentially-received-terrain-echo signals includes at least two terrain echo signals 32.

In another implementation of this embodiment, a first location of the peak amplitude is estimated by performing a Gaussian interpolation on signals in the first set of sequentially-received-terrain-echo signals. In an exemplary implementation of this embodiment, the programmable processor 60 estimates a first location of the peak amplitude by performing a Gaussian interpolation on the signals in the first set of sequentially-received-terrain-echo signals.

At block 704, a second location of the peak amplitude is estimated. In one implementation of this embodiment, the second location of the peak amplitude is estimated by measuring a difference in amplitude between signals in a second set of sequentially-received-terrain-echo signals. In an exemplary implementation of this embodiment, the programmable processor 60 estimates the second location of the peak amplitude by measuring the difference in amplitude between signals in the second set of sequentially-received-terrain-echo signals. The second set of sequentially-received-terrain-echo signals include at least two terrain echo signals 32 that are received after the first-sequentially-received-terrain-echo signals.

In another implementation of this embodiment, second location of the peak amplitude is estimated by performing a Gaussian interpolation on signals in the second set of sequentially-received-terrain-echo signals. In an exemplary implementation of this embodiment, the programmable processor 60 estimates the second location of the peak amplitude by performing a Gaussian interpolation on signals in a second set of sequentially-received-terrain-echo signals.

At block 706, the difference between the first location and the second location is calculated. In one implementation of this embodiment, the programmable processor 60 calculates the difference between the first location of the peak amplitude and the second location of the peak amplitude.

In one implementation of method 700, the level gate 130 slides outbound from the track gate position by a limited amount so that the level gate can not become disassociated from the target. In one implementation of a method for the level gate to track the signal peak, the programmable processor 60 measures the signal level at one position of the level gate 130 (a near level gate) and then offsets the level gate 130 outbound from its current position by some fraction of the transmitted pulsewidth, for example, 1/16th of a pulsewidth (a far level gate). If the difference in signal amplitudes between the far level gate and the near level gate is positive, the level gate 130 moves outbound. Conversely, if the difference in signal amplitudes between the far level gate and the near level gate is negative, then the level gate 130 moves inbound. When the difference between the two gates is zero, the far level gate and the near level gate will straddle the signal peak. In one implementation of this embodiment, the repositioning of the level gate 130 is proportional to the difference between the signal amplitudes at the far level gate position and the near level gate position. Then for a large difference in signal level between the far level gate position and the near level gate position, the level gate moves out more than if the difference between in signal level between the two level gate positions is small. Reasonable limits on maximum and minimum position changes and limits on the maximum amount the level gate can be separated from the track gate are required to control the amplitude excursions of the level gate and to keep the level gate associated with the target as measured by the track gate position. Acceptable limitations are dependent on the antenna beam width, transmitted pulse width, and the altitude as measured by the altimeter. Narrow antenna beam widths result in less terrain signal spreading than will occur with a wide beam width antenna. Terrain echo signal spreading is also less at lower altitudes and higher at high altitudes. However, terrain echo signal spreading is largely independent of the width of the transmitted pulse. In one implementation of this embodiment, a reasonable upper limit on the separation of the track and level gates could be 5% to 10% of the altitude as measured by the radar altimeter. In another embodiment, a reasonable upper limit on the separation of the track and level gates could be either a fraction or multiple of the transmitted pulse width. The lower limit on separation between the track gate and the level gate positions is a pulse width fraction equal to the percentage that the track reference is of the level reference. In one embodiment, the track reference is 50% of the level reference. Thus, the minimum separation between the track gate and level gate positions would be 50% of the width of the transmitted pulse.

Thus the methods 600 and 700 can be implemented by program product that includes program instructions, embodied on a storage medium 79, that are operable to cause a programmable processor 60 to execute the track gate control loop 70 to analyze the terrain echo signals 32 and to execute the level gate control loop 75 to analyze the terrain echo signals 32. The automatic gain control 80 executable by the programmable processor 60 adjusts the gain of the radio frequency receiver 57 or the radio frequency transmitter 52 or a combination of both. The adjustment is based on a comparison of the terrain echo signal level within the level gate 130 to the level reference amplitude level 266. The offset between the track gate 110 and the level gate 130 varies as the track gate control loop 70 and the level gate control loop 75 are executed and the center 134 of the level gate 130 is maintained near the peak amplitude 248 of the terrain echo signal and the center 114 of the track gate 110 is maintained near the selected reference amplitude 264.

Additionally the program product includes program instructions, embodied on the storage medium 79, that are operable to cause the programmable processor 60 to emit signals 22 from the airborne vehicle 10 directed toward a terrain 20 or 23, to receive terrain echo signals, to position a track gate 110 to a selected reference amplitude 264 on the rising edge of the terrain echo signals, to position a level gate 130 to within a selected range of the peak amplitude of the terrain echo signals, to measure a change in a location of the peak amplitude between sequentially received terrain echo signals and to vary a separation between the track gate 110 and the level gate 130 based on the measured change in the location of the peak amplitude.

In one implementation of this embodiment, the center 114 of the track gate 110 is positioned to the selected reference amplitude 264 on the rising edge of the terrain echo signals and the center 134 of the level gate 130 is positioned to within the selected range of the peak amplitude of the terrain echo signals. The position of the level gate 130 is adjusted toward the peak amplitude of the terrain echo signal 32 based on the measured change in the location of the peak amplitude. The instructions operable to cause the programmable processor to position the level gate 130 to within the selected range of the peak amplitude of the terrain echo signals comprise instructions that cause the programmable processor 60 to adjust the automatic gain control 80 of the receiver 57 based on the received terrain echo signals 32 in order to maintain the amplitude of the echo signal 32 to the level reference amplitude level 266.

Additionally the program product includes program instructions, embodied on the storage medium 79, that are operable to maintain the separation between the center 134 of the level gate 130 and the center 114 of the track gate 110 at less than a maximum separation $S_{max}$. The maximum separation $S_{max}$ is determined in part by the antenna pattern 24. Additionally the program product includes program instructions, embodied on the storage medium 79, that are operable to maintain the separation between the center 134 of the level gate 130 and the center 114 of the track gate 110 at more than a minimum separation $S_{min}$. The minimum separation $S_{min}$ is determined in part by the percentage of the track reference to the level reference and by the antenna pattern 24.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A method to control a track gate and a level gate in an altimeter tracking an altitude of an airborne vehicle, the method comprising:

emitting signals from the airborne vehicle, the signals directed toward a terrain;

receiving terrain echo signals, wherein the terrain echo signals comprise reflections of the emitted signals from the terrain, and wherein each terrain echo signal has a rising edge and a peak amplitude;

positioning the track gate in a temporal location to a selected reference amplitude on the rising edge of the terrain echo signals;

positioning the level gate in a temporal location to within a selected range of the peak amplitude level of the terrain echo signals;

measuring a change in a temporal location of the peak amplitude between sequentially received terrain echo signals; and varying a temporal separation between the track gate temporal location and the level gate temporal location based on the measured change in the temporal location of the peak amplitude.

2. The method of claim 1, wherein positioning the track comprises:

positioning a center of the track gate to the selected reference amplitude on the rising edge of the terrain echo signals.

3. The method of claim 1, wherein positioning the level gate comprises positioning a center of the level gate to within the selected range of the peak amplitude of the terrain echo signals.

4. The method of claim 1, wherein positioning the level gate comprises positioning a center of the level gate at the peak amplitude of the terrain echo signals.

5. The method of claim 1, farther comprising maintaining the temporal separation at less than a maximum temporal separation, the maximum temporal separation determined in part by an antenna pattern of the emitted signal.

6. The method of claim 5, farther comprising maintaining the temporal separation at more than a minimum temporal separation, the minimum temporal separation determined in part by a percentage of the track reference to a level reference.

7. The method of claim 1, farther comprising maintaining the temporal separation at more than a minimum temporal separation, the minimum temporal separation determined in part by a percentage of the track reference to the level reference.

8. The method of claim 1, wherein positioning the level gate in a temporal location to within the selected range of the peak amplitude comprises adjusting the temporal location of the level gate toward the temporal location of the peak amplitude of the echo signal based on the measured change in the temporal location of the peak amplitude.

9. The method of claim 1, wherein measuring the change in the temporal location of the peak amplitude comprises:

estimating a first temporal location of the peak amplitude by measuring a difference in amplitude between signals in a first set of sequentially-received-terrain-echo signals;

estimating a second temporal location of the peak amplitude by measuring a difference in amplitude between signals in a second set of sequentially-received-terrain-echo signals; and calculating the difference between the first temporal location and the second temporal location.

10. The method of claim 1, wherein measuring the change in the temporal location of the peak amplitude comprises:

estimating a first temporal location of the peak amplitude by performing a Gaussian interpolation on the signals in the first set of sequentially-received-terrain-echo signals;

estimating a second temporal location of the peak amplitude by performing a Gaussian interpolation on the signals in the first set of sequentially-received-terrain-echo signals; and calculating the difference between the first temporal location and the second temporal location.

11. The method of claim 1, further comprising:

measuring a change in the temporal location of the peak amplitude between the sequentially received terrain echo signals when the airborne vehicle one of rolls and pitches.

12. The method of claim 1, further comprising:

measuring a change in the temporal location of the peak amplitude between the sequentially received terrain echo signals when a slope of the reflecting terrain changes with respect to the airborne vehicle.

13. The method of claim 1, wherein positioning the level gate in a temporal location to within a selected range of the peak amplitude level of the terrain echo signal comprises:

adjusting an automatic gain control of a receiver based on the receiving terrain echo signals to maintain the peak amplitude of the echo signals at a level reference amplitude level.

14. A system to reduce coupled-control-loop oscillations between a track gate and a level gate in an altimeter that tracks the altitude of an airborne vehicle, the system comprising:

a track gate control loop that positions the track gate in time with respect to a received terrain echo signal to measure an amplitude at a selected reference amplitude;

a level gate control loop that positions the level gate in time with respect to the received terrain echo signal to maintain the peak amplitude of the terrain echo signal at a level reference amplitude level, wherein the temporal offset between the track gate and the level gate is variable;

a radio frequency transmitter adapted to emit radio frequency signals directed toward a terrain;

a radio frequency receiver adapted to receive the terrain echo signals reflected from the terrain; and a programmable processor adapted to execute the track gate control loop to analyze the terrain echo signals and adapted to execute the level gate control loop to analyze the terrain echo signals.

15. The system of claim 14, further comprising:

an automatic gain control algorithm executable by the programmable processor to adjust at least one of the gain of the radio frequency receiver and the gain of the radio frequency transmitter, wherein the terrain echo signal is adjusted based on a comparison of the terrain echo signal level within the level gate to the level reference amplitude level.

16. A program product comprising program instructions residing on a computer readable medium, wherein:

the computer readable medium holds program instructions to:

emit signals from an airborne vehicle directed toward a terrain;

receive terrain echo signals, wherein the terrain echo signals comprise reflections of the emitted signals from the terrain, and wherein each terrain echo signal has a rising edge and a peak amplitude;

position a track gate in a temporal location to a selected reference amplitude on the rising edge of the terrain echo signals;

position a level gate in a temporal location to within a selected range of the peak amplitude of the terrain echo signals;

measure a change in a temporal location of the peak amplitude between sequentially received terrain echo signals; and vary a temporal separation between the track gate temporal location and the level gate temporal location based on the measured change in the temporal location of the peak amplitude.

17. The program product of claim 16, farther comprising program instructions held on computer readable medium to:
   position a center of the track gate to the selected reference amplitude on the rising edge of the terrain echo signals; and
   position a center of the level gate to within the selected range of the peak amplitude of the terrain echo signals.

18. The program product of claim 17, farther comprising program instructions held on computer readable medium to:
   maintain the temporal separation at less than a maximum temporal separation, the maximum temporal separation determined in part by an antenna pattern; and
   maintain the temporal separation at more than a minimum temporal separation, the minimum temporal separation determined in part by a percentage of the track reference to a level reference.

19. The program product of claim 16, farther comprising program instructions held on computer readable medium to:
   adjust the temporal location of the level gate toward the temporal location of the peak amplitude of the echo signal based on the measured change in the temporal location of the peak amplitude.

20. The program product of claim 19, wherein program instructions to position the level gate in a temporal location to within the selected range of the peak amplitude of the terrain echo signals comprise program instructions held on computer readable medium to:
   adjust an automatic gain control of a receiver based on the receiving terrain echo signals to maintain the peak amplitude of the echo signal to a level reference amplitude level.

* * * * *